(12) United States Patent
Hatoum

(10) Patent No.: US 8,418,435 B2
(45) Date of Patent: Apr. 16, 2013

(54) METHOD FOR PRODUCTION OF POWER FROM ALUMINUM

(76) Inventor: Nagi Hatoum, New York, NY (US)

(*) Notice: Subject to any disclaimer, the term of this patent is extended or adjusted under 35 U.S.C. 154(b) by 617 days.

(21) Appl. No.: 12/456,160

(22) Filed: Jun. 12, 2009

(65) Prior Publication Data

US 2010/0028255 A1      Feb. 4, 2010

Related U.S. Application Data

(60) Provisional application No. 61/132,009, filed on Jun. 13, 2008.

(51) Int. Cl.
*C01B 3/08*        (2006.01)
*C01B 13/02*       (2006.01)

(52) U.S. Cl.
USPC ........... 60/217; 423/579; 423/648.1; 423/657

(58) Field of Classification Search ............ 423/657, 423/648.1, 579; 420/528; 60/217
See application file for complete search history.

(56) References Cited

U.S. PATENT DOCUMENTS

| | | | |
|---|---|---|---|
| 4,358,291 A * | 11/1982 | Cuomo et al. | 423/657 |
| 6,358,488 B1 | 3/2002 | Suda | |
| 7,115,247 B2 | 10/2006 | Zhao et al. | |
| 7,455,829 B2 * | 11/2008 | Eickhoff et al. | 423/658.2 |
| 8,080,233 B2 * | 12/2011 | Woodall et al. | 423/657 |
| 2001/0053346 A1 * | 12/2001 | Baldwin et al. | 423/657 |
| 2007/0217994 A1 * | 9/2007 | Amendola et al. | 423/648.1 |
| 2008/0056986 A1 | 3/2008 | Woodall et al. | |
| 2008/0063597 A1 * | 3/2008 | Woodall et al. | 423/657 |

* cited by examiner

*Primary Examiner* — Wayne Langel
(74) *Attorney, Agent, or Firm* — Todd N. Hathaway

(57) ABSTRACT

Aluminum is treated with an agent to prevent passivation of the aluminum during oxidation. The passivation preventing agent is a metal alloy containing gallium, preferably a eutectic alloy of gallium, indium and tin. The surface of the metallic aluminum is wetted with the eutectic alloy, suitably by scouring and/or immersion. The treated aluminum may be mixed with water, hydrogen peroxide or other suitable oxidizer in a controlled manner to produce hydrogen, heat, steam or oxygen for the use in power generation or chemical reactions. The passivation removal agent can be used in small quantities and is readily recoverable following the reaction.

14 Claims, 3 Drawing Sheets

METHOD FOR PRODUCTION OF POWER FROM ALUMINUM

RELATED APPLICATIONS

This application claims the benefit of U.S. Provisional Patent Application Ser. No. 61/132,009 filed on Jun. 13, 2008.

BACKGROUND OF THE INVENTION a. Field of the Invention

The present invention relates to the field of power generation, and more particularly to generation of power utilizing hydrogen produced in an aluminum-based water-split reaction.

b. Related Art

Currently, the price of conventional fuels such as fossil fuels and coal has been rising. This is the result of increased demand coupled with falling supply. Some scientists have suggested that fossil fuel reserves are being depleted, which as relates to petroleum they have termed "peak oil". The possible depletion of conventional fuels has encouraged the search for alternative source of fuels.

Hydrogen is an energy dense chemical that is being investigated for the use as an alternative to the conventional fuels for power generation. Hydrogen burns cleanly and can be regenerated, unlike fossil fuels.

There are many processes that generate hydrogen in the gaseous form, but the problem lies in distributing and storing gaseous hydrogen. Uncompressed gaseous hydrogen requires excessive volume, while compressed hydrogen requires bulky and expensive tanks, hence most transportation vehicles and other mobile devices are not suited to use of stored, gaseous hydrogen.

Instead of being stored in gaseous form, hydrogen can also be produced onsite, or onboard a device or vehicle, for example by hydrolysis or by chemical reaction. For example, metallic aluminum can be oxidized in water to produce hydrogen and also heat. The aluminum is converted by the reaction into an aluminum oxide (referred to as alumina), which is non toxic and the main component of clay and bauxite. The fact that hydrogen can be generated from aluminum "on demand" removes the need of gas storage tanks required for storing hydrogen gas.

Metallic aluminum is inexpensive and is produced from aluminum oxide by a process that uses electricity. The electricity can be generated in a renewable manner, for example by hydroelectric power, making the production of hydrogen from aluminum a green process. In addition, the alumina that is generated from the oxidation of aluminum can be recycled into aluminum.

However, aluminum does not readily react in water. A coating of aluminum oxide quickly forms on aluminum that prevents water from reacting with it. This coat of aluminum oxide is called the passivation layer because it prevents the continued reaction of aluminum with an oxidizer. The passivation layer can be chemically removed. The simplest way of removing the passivation layer is to use a 40% caustic soda solution. Aluminum oxide is a type of glass and glass is readily dissolved in caustic soda. Although caustic soda is very cheap, the reaction is difficult to control, to the point of being potentially dangerous, and caustic soda is not environmentally friendly.

Another process uses large quantities of Gallium as a passivation removal agent. However Gallium is very expensive and the aluminum must be melted with Gallium for the removal of the passivation layer, so that the process suffers significant economic and practical drawbacks. But a positive side of this reaction is that the gallium can be recovered.

An invention makes it possible to introduce hydrogen on the market in an economical and practical fashion, without changing the distribution system or requiring a total overhaul of transportation vehicles and other mobile devices, has the potential to be a "disruptive technology." A disruptive technology causes a technological paradigm shift with immense beneficial effects to society. The AC electrical power system, for example, is considered a disruptive technology that initiated the post industrial revolution, or the atomic age.

Accordingly, there exists a need for a practical method for producing power that uses hydrogen generated onsite or onboard a device or vehicle rather than relying on stored gaseous hydrogen. Furthermore, there exists a need for such a method that employs a reaction that is controllable and safe, and that is also environmentally benign. Still further, there exists a need for such a method that can be implemented on an inexpensive and economically viable basis.

SUMMARY OF THE INVENTION

The present invention addresses the problems cited above, and generates hydrogen and solves the storage problem at the same time. It uses readily available materials, namely metallic aluminum and water and/or hydrogen peroxide as an oxidizer.

In contrast to the prior methods described above, the present invention provides a far simpler, economical and cleaner approach to the removal of the aluminum oxide passivation layer. The present invention uses a eutectic alloy of gallium as the passivation removal agent.

The preferred eutectic alloy is formed of gallium, indium, and tin; one source of an eminently suitable eutectic alloy, referred to as Galinstan, is Coollaboratory, Ebendorf, Germany (www.coollaboratory.com). This alloy is liquid at −19 C; The fact that the Galinstan is in a liquid form improves its ability in disrupting the passivation layer on aluminum. Very little Galinstan is required to remove the passivation layer, hence the method is very economical to implement. During the reaction of Aluminum with water, Galinstan moves with the reaction front, continually exposing unoxidized Aluminum to water.

The use of Galinstan or a similar eutectic alloy as passivation removal agent is a central aspect of the present invention. The embodiments described below employ Galinstan as the preferred antipassivation agent, however it will be understood that other suitable similar or identical alloys, obtained from Coollaboratory or other sources, or made as a part of practicing the overall process, may also be used.

The use of hydrogen peroxide as an oxidizer in place of or in addition to water is another aspect the present invention. Hydrogen peroxide breaks down to water, oxygen and heat in contact with the treated aluminum. The resulting reaction is more exothermic and produces oxygen in addition to hydrogen. The hydrogen and oxygen can further be combusted to produce more heat. This reaction is particularly useful, for example, for rockets and turbines.

DETAILED DESCRIPTION

Figure 1:
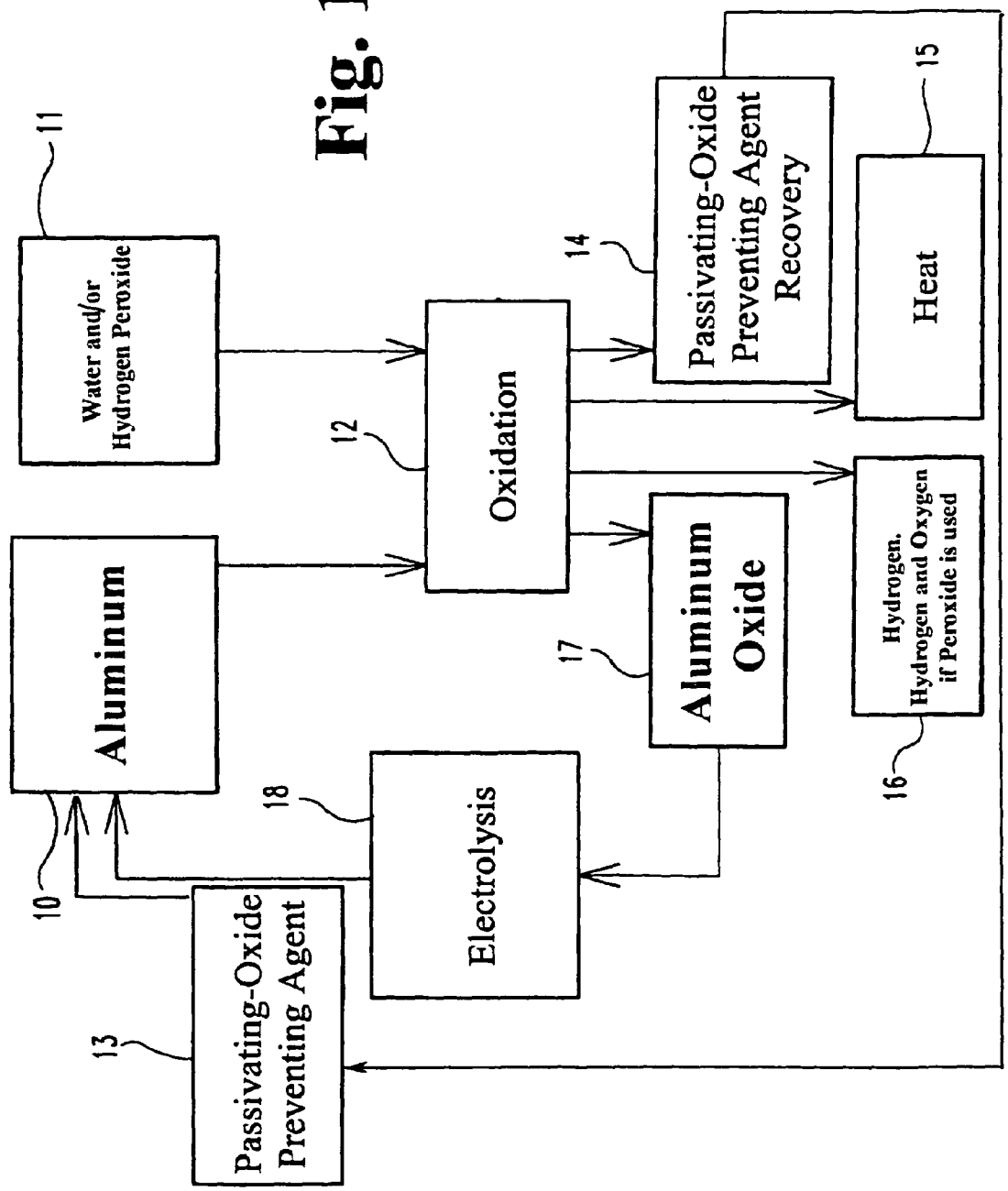
FIG. 1 is a flow chart showing the complete closed fuel cycle of the present invention using aluminum as the fuel and water and/or hydrogen peroxide as the oxidants.

For the purposes of promoting an understanding of the principles of the invention, reference will now be made to the embodiments illustrated in the drawings and described in the following written specification. It is understood that any alterations and modifications to the illustrated embodiments as would normally occur to one skilled in the art to which this invention pertains are encompassed with the scope of the invention.

In a preferred embodiment of the present invention, a reaction chamber or reaction engine is provided in which aluminum is reacted with water and/or hydrogen peroxide to produce hydrogen and heat. If hydrogen peroxide is used, oxygen is generated in addition to hydrogen. The aluminum is treated with the passivation preventing agent (alloy) so that the aluminum reacts continuously with the water to split the water into hydrogen and aluminum oxide. The hydrogen may be provided to a power generation element, such as a fuel cell or a combustion engine in a vehicle. More broadly, the aluminum-to-hydrogen methods of the present invention may be combined with apparatuses that convert the hydrogen, oxygen and heat into electrical, mechanical or thermal power.

Metallic aluminum is a material that oxidizes naturally, but as noted above forms a passivating oxide layer which inhibits further oxidation by virtue of isolating the unreacted aluminum from the oxidizer. In the present invention, the gallium containing alloy serves in the manner of a solvent which inhibits the passivation nature of the aluminum oxide layer by dissolving it and/or breaking it up. Eutectic gallium alloys like Galinstan are desirable because they are liquid at low temperatures and have low vapor pressures, thereby allowing a wide temperature window for the aluminum oxidation reaction.

The process for controlled oxidation of the aluminum using water as the oxygen supplying reagent and a gallium-containing alloy as the passivation preventing agent, follows these reaction equations:

$$2Al + 3H_2O \rightarrow Al_2O_3 + 3H_2 + \Delta E_1 \quad \quad 1)$$

$$2H_2 + O_2 \rightarrow 2H_2O + \Delta E_2 \quad \quad 2)$$

This process is renewable because the $Al_2O_3$ produced can be converted back into aluminum using reactions such as the following:

$$2Al_2O_3 + \Delta E_3 \rightarrow 4Al + 3CO_2 \quad \quad 3)$$

$$2Al_2O + 3C + \Delta E_4 \rightarrow 4Al + 3CO_2 \quad \quad 4)$$

The energy density of aluminum as a fuel compares extremely favorably to other known technologies, as demonstrated by the following Table I:

TABLE 1

| Fuel | Energy Density (kJ/g) | Engine | Efficiency (%) | Net Power (kJ/g) | Emission Products |
|---|---|---|---|---|---|
| Aluminum | 31 | Stirling or Fuel Cell | 25-50 25 | 7.8-15.5 7.8 | $Al_2O_3$ $H_2O$ |
| Gasoline | 47.5 | Internal | 20-35 | 9.5-11.9 | $CO_2$, CO, |

TABLE 1-continued

| Fuel | Energy Density (kJ/g) | Engine | Efficiency (%) | Net Power (kJ/g) | Emission Products |
|---|---|---|---|---|---|
| Methanol | 23 | Combustion Reformer + Fuel Cell | 30-40 | 6.9-9.2 | $NO_x$, $SO_x$, $H_2O$, $CO_2$, CO |

It will be noted that the products of reaction from the aluminum fuel are fully recyclable. The water may be recycled to provide additional oxidizer for the aluminum in the reaction process. The aluminum oxide is environmentally benign and is readily recyclable into aluminum that can be reused to generate hydrogen. It will also be noted that the heat product can be used by sterling engines or thermoelectric generators to increase efficiency. Even if only the hydrogen is used (as in a fuel cell), the resulting efficiency is still 25 percent.

The process steps used in the present invention are illustrated in the flow chart of FIG. 1. A source of aluminum 10 is treated with the agent (alloy) 13 which prevents formation of a passivating oxide on the surface of the aluminum, the treated aluminum is then combined with water and/or hydrogen peroxide 11 in a container 12. The metallic aluminum may be, for example, in the form of strips, rods, pellets, tubes or other solid forms having a surface, and may be substantially pure aluminum or may contain other materials in the way of impurities or alloys so long as they do not impede the oxidation process and action of the passivation preventing agent. The aluminum ordinarily forms an oxide coating upon exposure to the atmosphere, completely passivating the surface and inhibiting further oxidation. However, at a temperature sufficient to keep the agent 13 in a liquid state, the agent dissolves a portion of the aluminum and aluminum oxide layer thereby breaking up and preventing the formation of the oxide layer. This disruption of the oxide formation/deposition permits the oxidation reaction to continue and consume more of the aluminum.

Products resulting from this chemical reaction include: heat 15 and hydrogen 16 which are co-generated outputs; recovered agent 14, obtained from the agent 13 that is not otherwise consumed during the reaction; and aluminum oxide 17. Additionally, if hydrogen peroxide is used, oxygen 16 is produced in addition to hydrogen 16. The aluminum oxide byproduct 17 can be generally converted back into aluminum 10 through, for example, an electrolysis procedure 18, which usually requires the application of electrical current and heat using a Hall reactor.

Since the gallium alloy agent is inert, substantially all of the gallium alloy used in the reaction remains after the aluminum has been consumed. The gallium alloy may be re-used and is therefore nearly 100% recyclable. As noted above, Galinstan (available from Coollaboratory) is eminently suitable for this purpose, and is therefore used in this description, however other suitable alloys of a similar or identical nature can also be used in addition to or in place of Galinstan.

Prevention of the passivation layer is accomplished by wetting the surface of the aluminum. Wetting involves the Galinstan spreading on the surface, and can be achieved, for example, by mechanically scratching or sanding or otherwise scouring the surface until the Galinstan adheres to the aluminum. Other methods of wetting the aluminum can involve immersing/soaking the aluminum in Galinstan for an effective period, e.g. approximately two days. Ultrasound can be used to accelerate the process, as well as heat, mechanical agitation and electrolysis.

The aluminum can be treated with the preferred Galinstan alloy before reacting with the oxidizer, or during the reaction with the oxidizer.

Some of the Galinstan alloy separates from the aluminum during the reaction of the Aluminum with the oxidizer. When the reaction of the aluminum with the oxidizer is exhausted, all the Galinstan is usually mixed with the aluminum oxide, which may be suspended or floating in the reaction solution. The following methods can be used to recover the Galinstan alloy:

(a) Galinstan can be recovered by adding a base, like sodium hydroxide, to the aluminum oxide in suspension; the alloy will precipitate from the solution and form a liquid pool.

(b) Galinstan can be recovered from the aluminum oxide by filtering the aluminum oxide and then pressing/squeezing the filtrate or using ultrasound and/or mechanical vibration.

(c) Galinstan can be recovered during the reduction of the aluminum oxide to aluminum; the alloy is generally inert and will separate from the aluminum oxide when it is reduced.

The Galinstan can be recovered during the reaction with the oxidizer or after the reaction with the oxidizer:

(a) If the Galinstan is to be recovered during the reaction of the aluminum with the oxidizer; a filtration system can be used that collects the aluminum oxide and extracts the Galinstan, which then is reused to remove the passivation layer of the Aluminum in the reactor. Adding a base to the oxidizer may also recover the Galinstan during oxidation.

(b) If the Galinstan is to be recovered after the reaction of the aluminum with the oxidizer, the remaining products of reaction are collected and treated accordingly to recover the Galinstan.

The aluminum oxide can be recycled into aluminum. This can be done by reducing the aluminum oxide back to aluminum using the Hall-Heroult process. By recovering the aluminum, a closed fuel cycle is achieved where there is no need to renew the raw materials, as is the case with fossil fuels.

The reaction of oxidizing the aluminum can be done in a controlled manner by either modulating the flow of oxidizer (water and/or hydrogen peroxide) into the reaction, and/or modulating the flow of the fuel (aluminum) into the reaction. This in effect allows the production of hydrogen on demand.

The hydrogen from the reaction can be burned directly in a combustion engine or a turbine, or used in a fuel cell. The heat generated by the reaction can be used to run a sterling engine or a thermo electric converter thus boosting efficiency.

The hydrogen from the reaction can also be used in a chemical reaction. Hydrogen sometimes is needed for industrial purposes.

By using hydrogen peroxide as an oxidizer, the resultant products of reaction are hydrogen, oxygen, heat and aluminum oxide.

Hydrogen peroxide is decomposed into oxygen and water upon contact with the treated aluminum or a catalyst. The water then reacts with the aluminum and produces hydrogen and aluminum oxide. Hydrogen peroxide decomposes exothermically into water and oxygen gas spontaneously:

$$2H_2O_2 \rightarrow 2H_2O + O_2$$

This process is very favorable thermodynamically. It has a $\Delta H_o$ of $-98.2$ kJ·mol$-1$ and a $\Delta G_o$ of $-119.2$ kJ·mol$-1$ and a $\Delta S$ of 70.5 J·mol$-1$·K$-1$. The rate of decomposition is dependent on the temperature and concentration of the peroxide, as well as the pH and the presence of impurities and stabilizers. Hydrogen peroxide is incompatible with many substances that catalyze its decomposition, including most of the transition metals and their compounds.

Using hydrogen peroxides or a mixture of hydrogen peroxide and water to oxidize aluminum results in the release of more energy than reacting aluminum with water only.

Hydrogen peroxide and water mixture reacted with aluminum in accordance with the present invention can be used as a bipropellant fuel in rocket engine or turbines. The reaction is highly energetic but controlled, which is desirable feature for rocket engine and turbines.

Figure 2:
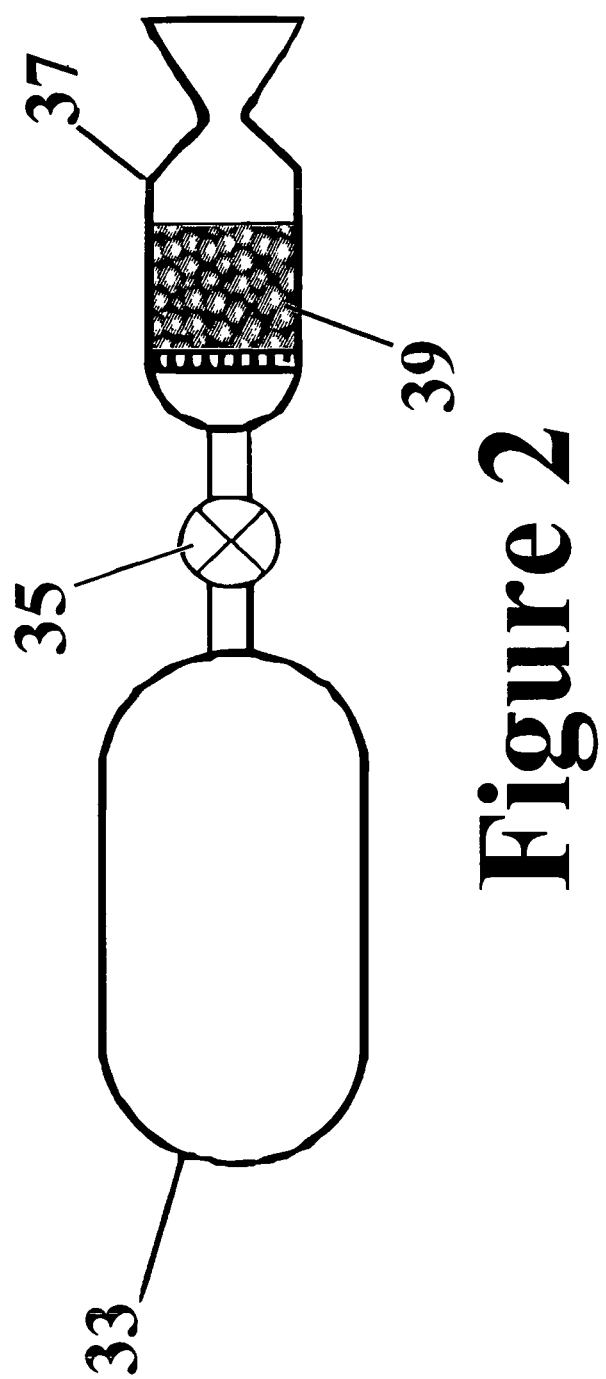
FIG. 2 is a cross-sectional view of a hydrogen generation apparatus in accordance with the present invention, showing the main reactor assembly in association with the control mechanisms of the apparatus.

FIG. 2 shows an embodiment of the hydrogen peroxide and aluminum reaction in a rocket engine. The schematic shows a container for the hydrogen peroxide 33, which a pump 35 forces into the reaction chamber 37. The aluminum 39 that has been treated with Galinstan is present in the reaction chamber 37. The aluminum can be in the form, for example, of metallic rods, pellets, tubes. It is envisioned that the Galinstan will be blown away with the aluminum oxide out of the reaction chamber, however once the reaction is started, the extreme heat and pressures and the reducing effect of hydrogen will prevent the passivating oxide layer from forming.

Figure 3:
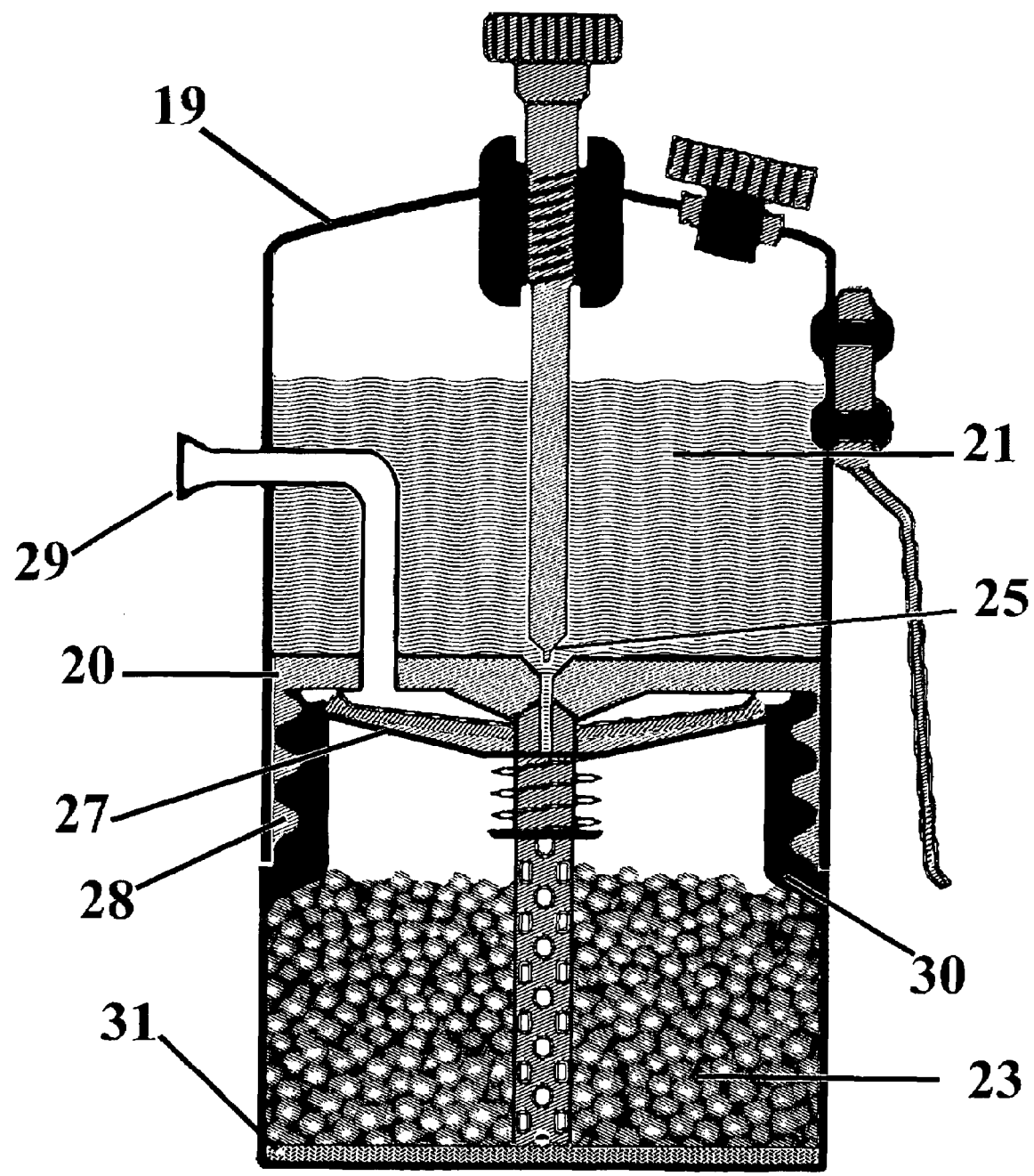
FIG. 3 is a schematic view of a rocket engine using aluminum and hydrogen peroxide as a bipropellant fuel in accordance with the present invention.

FIG. 3 shows another way in which the aluminum and water reaction can be implemented on a practical basis. Container 19 shown in FIG. 3 is made of two compartments: One compartment 20 contains the oxidizer (water and/or hydrogen peroxide) 21 and the other compartment 30 contains the aluminum 23 and Galinstan 31. Compartment 20 and 30 are assembled together by means of threads 28 to form the container 19. The oxidizer 21 is introduced in the compartment 30 containing the aluminum 23 and Galinstan 31 via a flow control mechanism 25. The hydrogen that is produced from the resulting reaction is separated from the other reaction products by means of a filter 27 and flow out from the container 19 through pipe 29. After the exhaustion of the aluminum 23, the bottom compartment 30 is screwed out and replaced with a container filled with unreacted aluminum.

It will be understood that while the invention has been illustrated and described in detail in the drawings and foregoing description, the same should be considered as illustrative and not restrictive in character. It is therefore to be recognized that these and various other alterations, modifications, and/or additions may be introduced into the constructions and arrangements of parts described above without departing from the spirit or ambit of the present invention as defined by the appended claims.

What is claimed is:

1. A method of production of hydrogen, said method comprising the steps of:
providing an aluminum material;
applying to said aluminum material an eutectic alloy containing gallium in an amount effective to prevent passivation of said aluminum material;
reacting said aluminum material to which said eutectic alloy has been applied with a hydrogen-containing oxidant so as to generate hydrogen and heat; and
recovering aluminum oxide and at least a portion of said eutectic alloy following reaction of said aluminum material with said oxidant, the step of recovering at least a portion of said eutectic alloy comprising:
mixing a base with products of the reaction so as to precipitate said portion of said eutectic alloy from a suspension of said aluminum oxide.

2. A method of production of hydrogen, said method comprising the steps of:
providing a plurality of bodies of solid aluminum material;
wetting exposed surfaces of said bodies of aluminum material with an eutectic alloy containing gallium in an amount effective to prevent passivation of said aluminum material so that said eutectic alloy spreads out over said surfaces of said bodies of aluminum material; and reacting said bodies of aluminum material having said wetted surfaces with a hydrogen-containing oxidant so as to generate hydrogen and heat.

3. The method of claim 2, wherein said plurality of bodies of solid aluminum material is selected from the group consisting of:
   strips of aluminum material;
   rods of aluminum material;
   pellets of aluminum material; and
   tubes of aluminum material.

4. The method of claim 2, wherein said plurality of bodies of solid aluminum material comprises a plurality of bodies of solid aluminum material consisting essentially of pure aluminum.

5. The method of claim 2, wherein said hydrogen-containing oxidant comprises water.

6. The method of claim 2, wherein said hydrogen-containing oxidant comprises hydrogen peroxide, so that reacting said oxidant with said aluminum material generates oxygen in addition to hydrogen.

7. The method of claim 2, wherein said eutectic alloy comprises gallium, indium and tin.

8. The method of claim 2, wherein the eutectic alloy consists essentially of Gallium, Indium, and Tin.

9. The method of claim 8, wherein said eutectic alloy comprises gallium in an amount of about 68.5% (sixty-eight and one-half percent), indium in an amount of about 21.5% (twenty-one and one-half percent), and tin in an amount of 10% (ten percent), by weight.

10. The method of claim 2, further comprising the step of:
    disrupting a pre-existing, naturally occurring oxide layer on said exposed surface of said plurality of bodies of solid aluminum material prior to wetting said surfaces with said eutectic alloy.

11. The method of claim 10, wherein the step of disrupting said naturally occurring oxide layer on said plurality of bodies of solid aluminum material comprises subjecting said naturally occurring oxide layer to one or more members selected from the group consisting of:
    mechanical disruption;
    thermal disruption;
    chemical disruption; and
    electrical disruption.

12. The method of claim 2, wherein the step of reacting said plurality of bodies of solid aluminum material with said oxidant comprises:
    reacting said plurality of bodies of solid aluminum in a reactor vessel into which said oxidant is introduced in a controlled manner.

13. The method of claim 6, further comprising the step of:
    combusting said hydrogen and oxygen in a turbine engine.

14. The method of claim 6, further comprising the step of:
    combusting said hydrogen and oxygen in a rocket motor.

* * * * *